United States Patent [19]
Takai

[11] Patent Number: 4,606,019
[45] Date of Patent: Aug. 12, 1986

[54] RECEIVE DATA PROCESSING DEVICE FOR TDMA SATELLITE COMMUNICATIONS NETWORK

[75] Inventor: Haruki Takai, Tokyo, Japan

[73] Assignee: NEC Corporation, Tokyo, Japan

[21] Appl. No.: 732,421

[22] Filed: May 9, 1985

[30] Foreign Application Priority Data

May 15, 1984 [JP] Japan .................................. 59-97018

[51] Int. Cl.⁴ ............................................... H04J 1/16
[52] U.S. Cl. ........................................ 370/13; 370/104
[58] Field of Search ............................. 370/13, 104, 79

[56] References Cited
U.S. PATENT DOCUMENTS 4,334,303  6/1982  Bertin et al. ............................ 370/13
4,546,467 10/1985  Yamamoto ............................. 370/13
4,555,782 11/1985  Alaria et al. .......................... 370/104
4,575,839  3/1986  Ogata et al. ........................... 370/13

Primary Examiner—Douglas W. Olms
Assistant Examiner—Curtis Kuntz
Attorney, Agent, or Firm—Laff, Whitesel, Conte & Saret

[57] ABSTRACT

A receive data processing device for monitoring operating conditions of TDMA ground stations which is installed in a TDMA reference ground station adapted to monitor and control TDMA satellite communications channels. An idle time in each of TDMA frames which constitute a plurality of received burst signal sequences are effectively utilized for multiplexing and, thereby, totally processing monitoring data associated with the respective ground stations.

1 Claim, 7 Drawing Figures

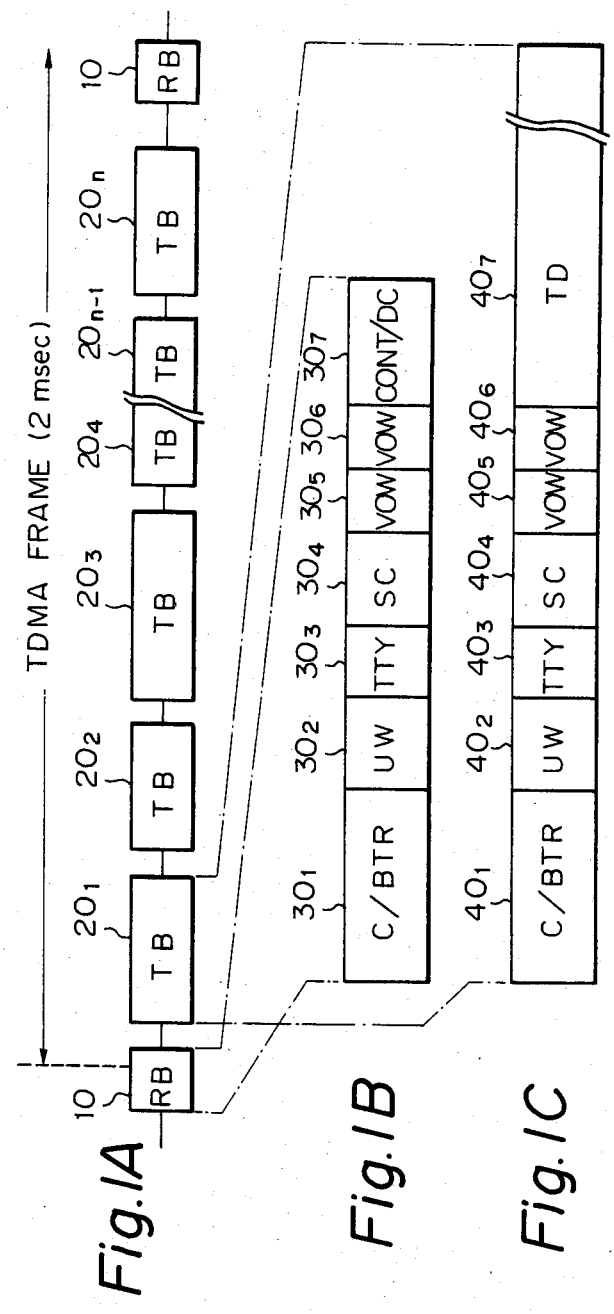

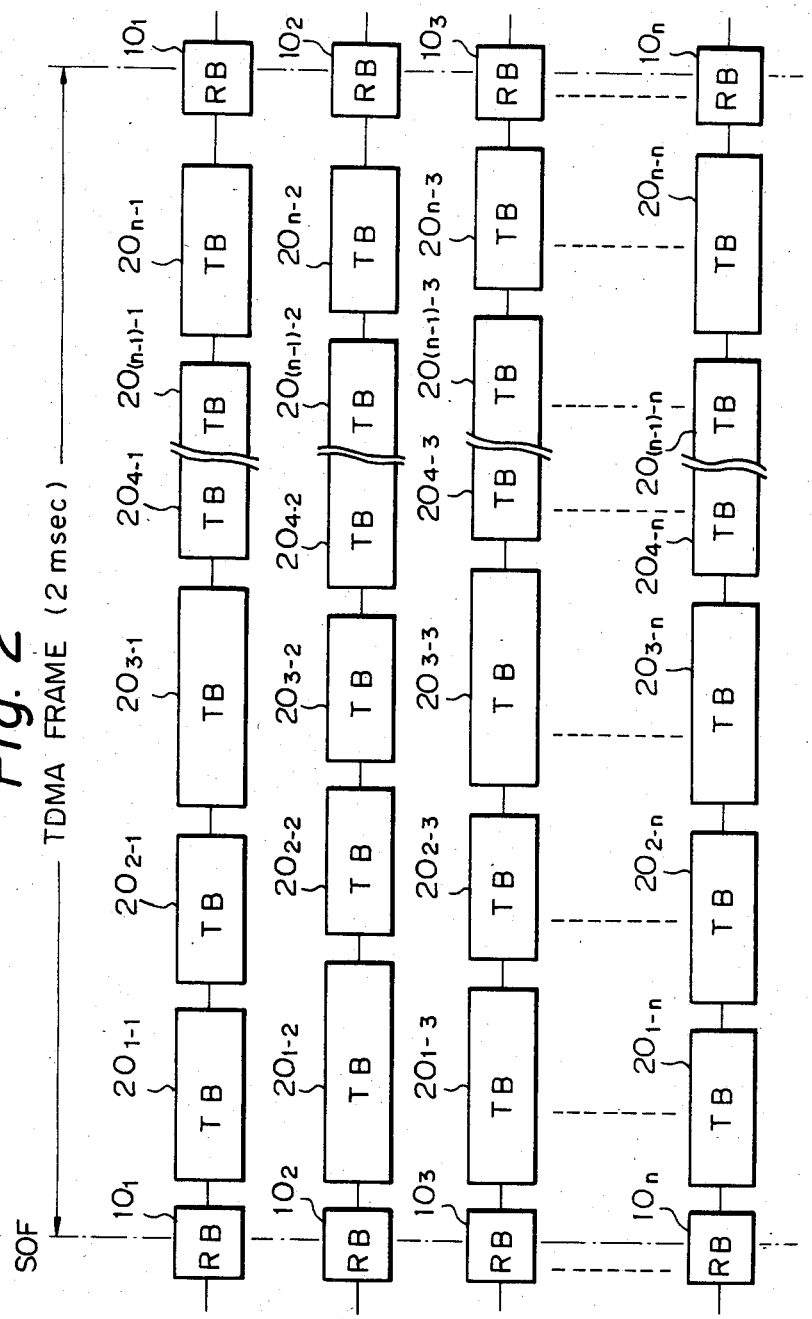

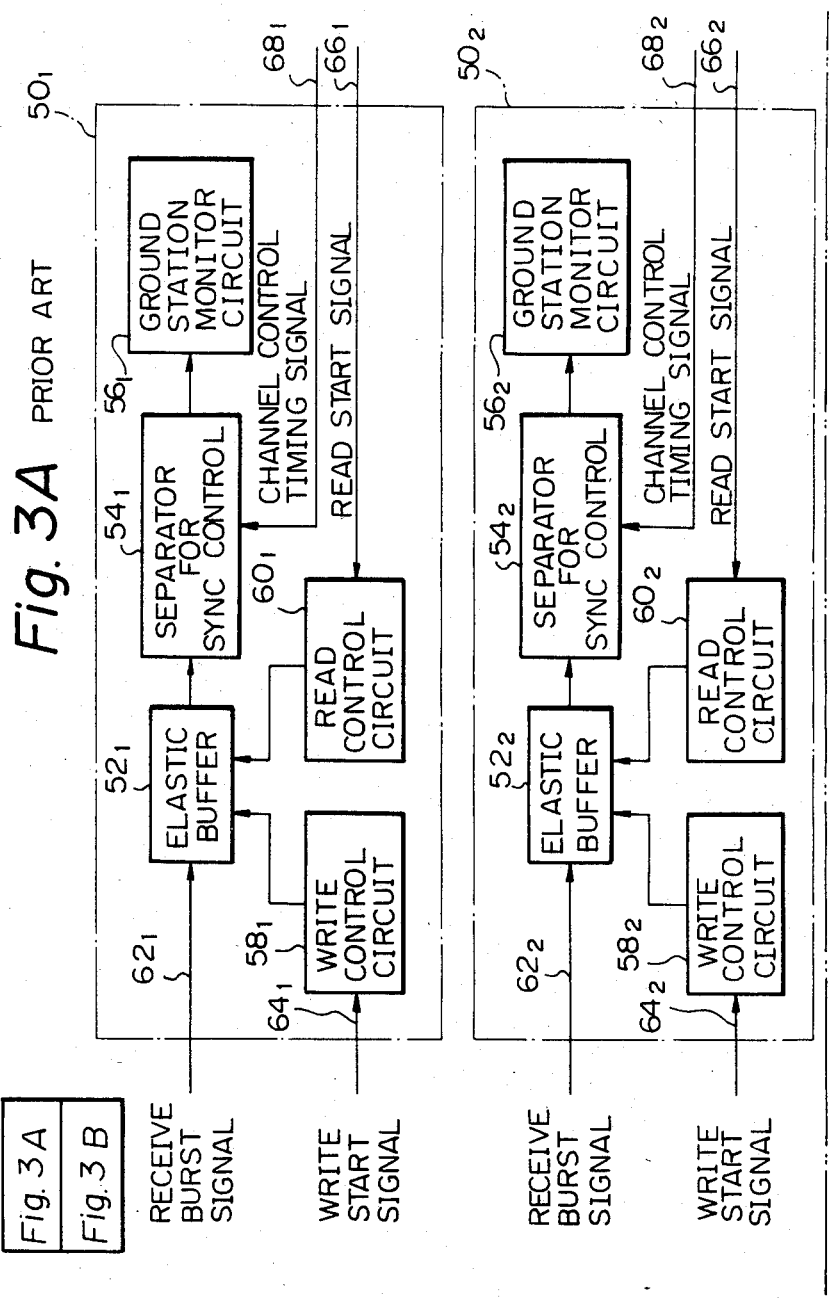

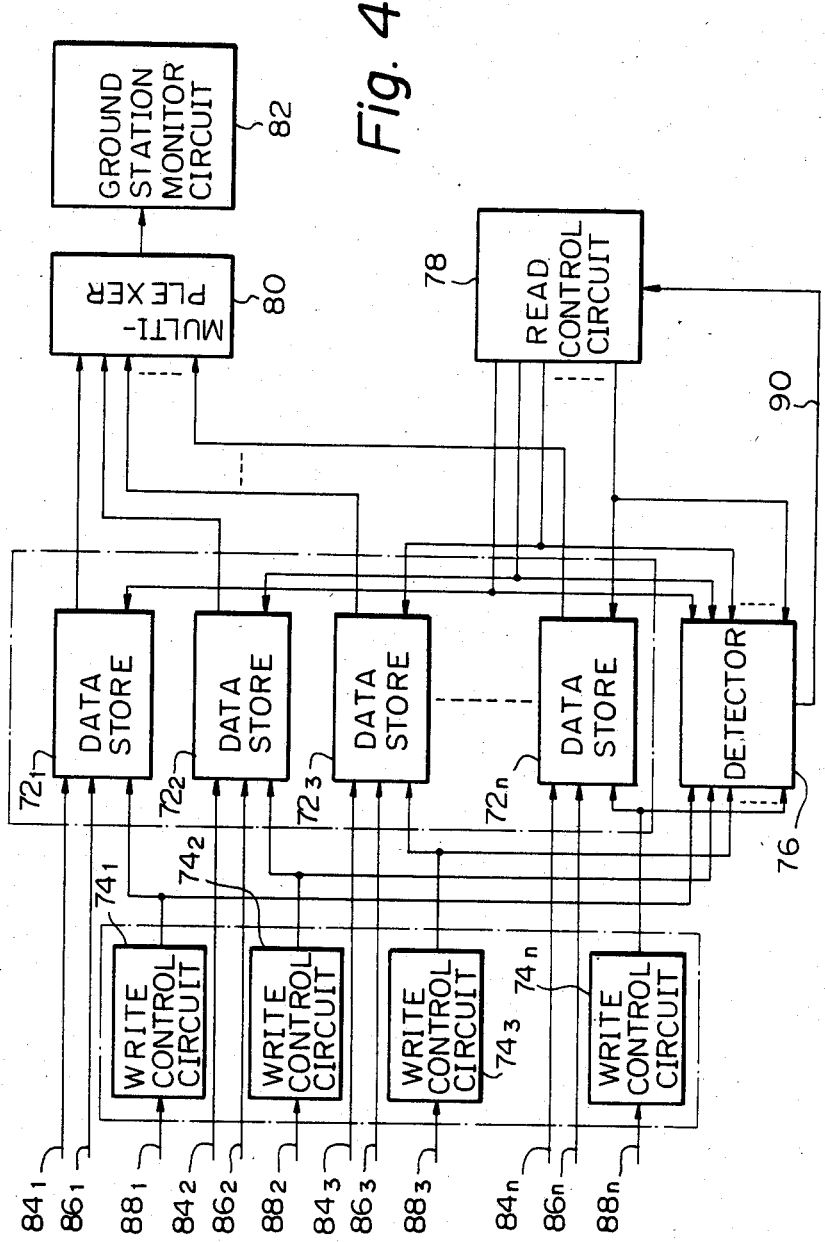

RECEIVE DATA PROCESSING DEVICE FOR TDMA SATELLITE COMMUNICATIONS NETWORK

BACKGROUND OF THE INVENTION

The present invention relates to a receive data processing device and, more particularly, to a receive data processing device installed in a reference ground station of a time division multiple access (TDMA) satellite communications network, which is adapted to monitor and control satellite communications channels, in order to monitor operating conditions of the other ground stations which it covers.

As well known in the art, a TDMA communications system has recently been developed as one of communications systems which are applicable to satellite communications channels of the kind using digital modulation. Details of a TDMA communications system are discussed in OUTLINE OF INTELSAT TDMA/DSI SYSTEM, Study of International Communications, No. 110, pages 53-83, published Oct. 1981 in Japan, and others and, therefore, will not be described herein.

In a TDMA satellite communications system, a communication satellite usually mount therein a transponder having a plurality of transponder channels, while a predetermined number of reference ground stations and a predetermined number of other ground stations which provide a traffic system are distributed each in a predetermined area for the multiple transponder channels. Basically, the TDMA communications system is devised for allowing a repeating function assigned to the transponder to be shared by the ground stations inclusive of the reference stations on a time division basis.

In a TDMA communications system, a time sequence generally referred to as a TDMA frame and extending over 2 milliseconds is divided into a predetermined number of time slots to assign the time slots to ground stations in a network in one-to-one correspondence. Satellite communications channels are set up such that any of the ground stations inclusive of the reference station is capable of using the transponder excluding the others for a predetermined period of time.

A prior art receive data processing device is provided with $n$ (particular positive integer) received data processing sections in correspondence with $n$ satellite transponder channels in order to accommodate $n$ independent TDMA frames or sequences. Each of the receive data processing sections is made up of an elastic buffer, a signal separator for sync control, a terminal monitor circuit, a write control circuit, a read control circuit, etc. It follows that, where $n$ receive burst data sequences come in in correspondence with $n$ transponder channels and all the ground stations are to be monitored, $n$ receive data processing sections are needed in one-to-one correspondence with the receive burst data sequences, resulting in a a receive data processing device having a prohibitive circuit scale.

SUMMARY OF THE INVENTION

It is therefore an object of the present invention to provide a receive data processing device for a TDMA satellite communications network which is installed in a reference ground station of the network for monitoring and controlling the network and capable of eliminating the drawback particular to the prior art device.

It is another object of the present invention to provide a receive data processing device for a TDMA satellite communications network which scales down the necessary circuit configuration and enhances efficient transfer of channel monitoring information associated with each ground station to a ground station monitor circuit.

It is another object of the present invention to provide a generally improved received data processing device for a TDMA satellite communications network.

A receive data processing device of the present invention is installed in a reference ground station which totally monitors and controls operating conditions of two or more other ground stations which constitute a ground traffic system of TDMA satellite communications channels. The device comprises data stores for temporarily storing channel monitoring information signals which respectively are associated with operating conditions of the ground stations and separated from $n$ (particular positive integer) sequences of receive burst signals, which are received by way of an $n$-channel transponder loaded in a predetermined communication satellite, and predetermined burst identification signals for identifying the channel monitoring information signals in correspondence with the respective ground stations. A write control temporarily stores in the data stores associated with the $n$ sequences of receive burst signals the channel monitoring information signals and burst identification signals associated respectively with the predetermined ground stations which correspond to the respective sequences. A read control sequentially specifies in response to a predetermined read data sequence specify signal the channel monitoring information signals and the burst identification signals which are temporarily stored in the data stores and associated respectively with the ground stations which are associated with the $n$ sequences of received burst signals, and then reading out the specified information signals each by an amount which is specified by the read data sequence specify signal. A detector detects amounts of data stored in data store areas of the data stores which respectively are associated with the ground stations in the $n$ sequences in response to predetermined write data amount indication signals and read data amount indication signals which respectively are outputted from the write control and the read control during a write control operation and a read control operation, and then generating the read data sequence specify signal which gives priority to a particular one of the data store areas having stored the greatest amount of data and specifies a particular amount of data to be read out. A multiplexer multiplexes the channel monitoring information signals and the burst identification signals which respectively are associated with the ground stations in the $n$ sequences and sequentially read out of the data stores. A ground station monitor classifies the multiplexed channel monitoring information signals and the burst signals outputted from the multiplexer and associated with the respective ground stations in the $n$ sequences, and functioning to monitor use of the TDMA system which is related to operating conditions of the respective ground stations.

In accordance with the present invention, a receive data processing device for monitoring operating conditions of TDMA ground stations which is installed in a TDMA reference ground station adapted to monitor and control TDMA satellite communications channels is provided. An idle time in each of TDMA frames which constitute a plurality of received burst signal sequences are effectively utilized for multiplexing and, thereby, totally processing monitoring data associated with the respective ground stations.

The above and other objects, features and advantages of the present invention will become more apparent from the following detailed description taken with the accompanying drawings.

BRIEF DESCRIPTION OF THE DRAWINGS

FIGS. 1A-1C show a TDMA frame format and burst formats;

FIG. 2 shows $n$ independent TDMA frames;

FIGS. 3A-3B are block diagrams representative of part of a prior art received data processing device; and FIG. 4 is a block diagram representative of a receive data processing device in accordance with the present invention.

DESCRIPTION OF THE PREFERRED EMBODIMENT

Figure 3B:
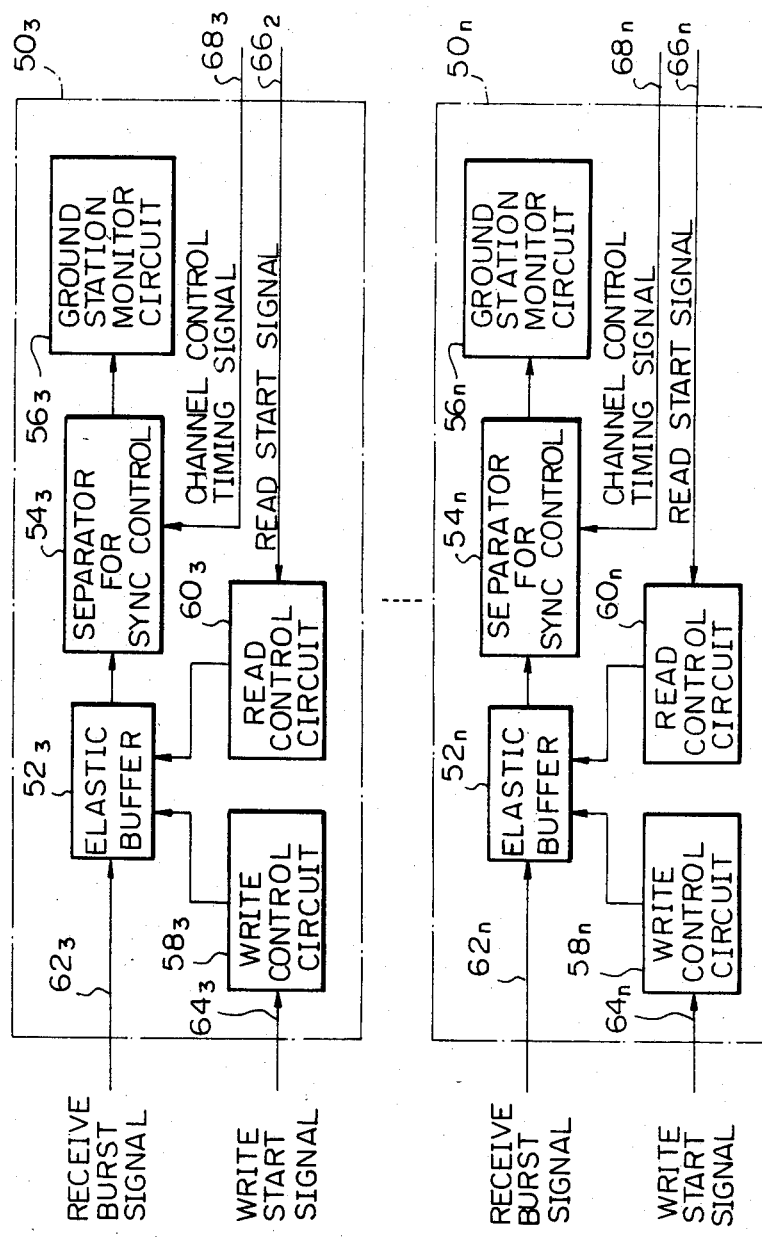

While the received data processing device for a TDMA satellite communications network of the present invention is susceptible of numerous physical embodiments, depending upon the environment and requirements of use, a substantial number of the herein shown and described embodiment have been made, tested and used, and all have performed in an eminently satisfactory manner.

Referring to FIG. 1A, there is shown an exemplary TDM frame associated with one transponder channel and applicable to a case wherein $n$ (particular positive integer) ground stations are linked with one reference ground station. Specificaly, the TDMA frame consists of a reference burst (RB) 10 which provides a reference for TDMA frame timing, and traffic bursts (TB) $20_1$, $20_2$, $20_3$, ... $20_n$ corresponding to time slots which respectively are exclusively assigned to the ground stations other than the reference station. The RB 10 is in a format such as shown in FIG. 1B and the TB $20_1$, in a format such as shown in FIG. 1C. As shown, the RB 10 and the TB $20_1$ share the same burst format over their six consecutive sections. This is true with the other TBs, $20_2$-$20_n$.

In FIGS. 1B and 1C, the six sections commonly included in the RB 10 and TB $20_1$ are the data associated with carrier and bit timing recoveries (C/BTR) $30_1$ and $40_1$, data associated with unique words (UW) $30_2$ and $40_2$, data associated with teletype orders $30_3$ and $40_3$, data associated with service channels (SC) $30_4$ and $40_4$, and data associated with voice order wires (VOW) $30_5$, $30_6$, $40_5$ and $40_6$. In FIG. 1B, the last section of the RB 10 is representative of a control and delay channel (CONT/DC) $30_7$ which corresponds to a channel adapted for the transmission of CONT/DC messages from the reference ground station to the other ground stations. The last section in FIG. 1C, on the other hand, is representative of traffic data (TD) $40_7$.

In the case where a single communication satellite carries a transponder having $n$ channels, $n$ TDMA frames may be configured as shown in FIG. 2 in correspondence with the respective transponder channels. The TDMA frames shown in FIG. 2 are representative of a distribution of $n$ ground stations for a single reference ground station. So long as the satellite communications channels are normally operated, $n$ sequences of reference bursts RB $10_1$, $10_2$, $10_3$, ..., $10_n$ occur in synchronism with predetermined SOF (Start of TDMA Frame), while individual sequences of traffic bursts (TB) $20_{1-1}$ through $20_{n-1}$, $20_{1-2}$ through $20_{n-2}$, $20_{1-3}$ through $20_{n-3}$, ..., $20_{1-n}$ through $20_{n-n}$ are set up in a normal synchronous state in correspondence with the $n$ ground stations. Needless to mention, each reference burst (RB) and each traffic burst (TB) shown in FIG. 2 is identical in format with those of FIG. 1.

With regard to the receive data processing device of the present invention, burst data in the respective sequences which are necessary as informations for monitoring channels of the TDMA system comprise all or part of the unique words (UW), teletype order (TTY) data, service channel (SC) data, voice order wire (VOW) data, control and delay channel (CONT/DC) data, and other data except and, of course, not the traffic data (TD). In the following description, therefore, let each received sequence of burst data applied to the receive data processing device be limited to channel monitoring informations associated with the TDMA system.

Now, a prior art receive data processing device will be outlined on the basis of the TDMA frame configuration discussed above.

Referring to FIG. 3, a prior art receive data processing device comprises $n$ receive data processing sections $50_1$, $50_2$, $50_3$, ..., $50n$ which are assigned in one-to-one correspondence to $n$ transponder channels in such a manner as to accommodate $n$ sequences of TDMA frames. The sections $50_1$ through $50_n$ include respectively elastic buffers $52_1$, $52_2$, $52_3$, ..., $52_n$, signal separator circuits $54_1$, $54_2$, $54_3$, ..., $54_4$ adapted for sync control, terminal monitor circuits $56_1$, $56_2$, $56_3$, ..., $56_n$, write control circuits $58_1$, $58_2$, $58_3$, ..., $58_n$, and read control circuits $60_1$, $60_2$, $60_3$, ..., $60_n$.

In FIG. 3, while the TDMA satellite communications channels are in normal use, receive burst data sequences $62_1$, $62_2$, $62_3$, ..., $62_n$ are applied from demodulators (not shown) to the elastic buffers $52_1$, $52_2$, $52_3$, $52_n$, in the sections $50_1$, $50_2$, $50_3$, ..., $50_n$ respectively, which may monitor the channel conditions. The receive burst data are written into their associated elastic buffers $52_1$, $52_2$, $52_3$, $52_n$ in response to write control signals which the write control circuits $58_1$, $58_2$, $58_3$, ..., $58_n$ generate triggered respectively by predetermined write start signals $64_1$, $64_2$, $64_3$, ..., $64_n$ provided from UW detectors (not shown). Thereafter, the receive burst data are read from the elastic buffers in response to read control signals which the read control circuits $60_1$, $60_2$, $60_3$, ..., $60_n$ produce triggered respectively by predetermined read start signals $66_1$, $66_2$, $66_3$, ..., $66_n$ provided from receive timing generators (not shown) and, then, routed respectively to the signal separators $54_1$, $54_2$, $54_3$, ..., $54_n$. The write and read procedure with the elastic buffers $62_1$, $62_2$, $62_3$, ..., $62_n$ serves to absorb errors in the receive timings of the burst data sequences $62_1$, $62_2$, $62_3$, $62_n$, whereby the burst data sequences are rearranged in a predetermined synchronous state with respect to a receive time base at the reference station.

The separators $54_1$, $54_2$, $54_3$, ..., $54_n$ are adapted to extract, timed to their associated channel control timing signals $68_1$, $68_2$, $68_3$, ..., $68_n$ provided from the receive timing generators, the burst data associated with unique words (UW), teletype orders (TTY), service channels (SC), voice order wires (VOW), and control and delay channels (CONT/DC) representative of the respective ground stations other than the reference station. The separated burst data are fed to the terminal monitor circuits $56_1$, $56_2$, $56_3$, ..., $56_n$, respectively. Each of these terminal monitor circuits monitors operating conditions of the TDMA system using the monitoring data associated with the respective ground stations associated therewith.

The prior art receive data processing device having the above construction is satisfactory so long as only a single sequence of receive burst data is employed. However, where $n$ independent sequences of receive burst data are employed in correspondence with $n$ satellite transponder channels and all the ground stations need be monitored at the same time, as shown in FIG. 3, the received burst data sequences have to be accommodated by a corresponding number of receive data processing sections scaling up the circuit configuration of the device to a significant extent, as previously stated.

In accordance with the present invention, an idle time in each TDMA frame which makes up a plurality of receive burst signal sequences with the others are effectively utilized to advantageously reduce the circuit scale and enhance efficient data transfer to a ground station monitor circuit, with the aid of multiplex processing of monitoring associated with respective ground stations.

Referring to FIG. 4, a receive data processing device embodying the present invention is shown in a block diagram. The receive data processor, generally 70, comprises data stores $72_1, 72_2, 72_3, \ldots, 72_n$, write control circuits $74_1, 74_2, 74_3, \ldots, 74_n$, a detector 76 responsive to stored amounts of data as will be described, a read control circuit 78, a multiplexer 80, and a ground station monitor circuit 82, for $n$ independent sequences of receive burst signals.

As shown in FIG. 4, the data stores $72_1$ through $72_n$ and write control circuits $74_1$ through $74_n$ respectively are matched with $n$ receive burst signal sequences. Receive burst data sequences $84_1, 84_2, 84_3, \ldots, 84_n$ provided from the demodulators and burst identification signals $86_1, 86_2, 86_3, \ldots 86_n$ provided from the receive timing generators respectively are applied to the data stores $72_1, 72_2, 72_3, \ldots, 72_n$. The receive burst data sequences $84_1, 84_2, 84_3, \ldots, 84_n$ are written into their associated addresses of the data stores $72_1, 72_2, 72_3, \ldots, 72_n$ in response to write control signals which are outputted from the write control circuits $74_1, 74_2, 74_3, \ldots, 74_n$ triggered by their associated write start signals $88_1, 88_2, 88_3, \ldots, 88_n$, by referencing the accompanying burst identification signals $86_1, 86_2, 86_3, \ldots, 86_n$ provided from the UW detectors. At the same time, the write control signals are routed to the detector 76 to bifunction as signals indicative of amounts of data being stored in their associated data stores $72_1, 72_2, 72_3, \ldots, 72_n$.

While the receive burst data sequences $84_1$ through $84_n$ are written into the associated stores $72_1$ through $72_n$, the detector 76 generates a predetermined signal 90 which specifies a particular data sequence to be read out. The read control circuit 78, which is controlled by the signal 90, applies a predetermined read control signal to the corresponding one of the data stores $72_1$ through $72_n$. The read control signal outputted from the read control signal 78 is applied to the detector 76 as well. Here, the signal 90 contains control information representative of a receive burst data sequence to be read out, an amount of data to be read out, and the like. Hence, the read control signals from the read control circuit 78 are sequentially applied to the data stores $72_1$ through $72_n$ as specified by the signal 90, with the result that specified burst data sequences are each read out by a specified amount while being sequentially coupled to the multiplexer 80.

As described above, the read control 78 supplies the detector 76 with a control signal representative of a particular amount of data to be read out, in parallel with its control over the readout of burst data. The detector 76, therefore, references the write control signals from the write control circuits $74_1$ through $74_n$ and the read control signal so as to detect amounts of data present in the store areas associated with the respective burst data in the $n$ sequences, then gives priority to that burst data which is associated with the data store area storing the greatest amount of data, then generates a signal 90 specifying the particular receive burst data sequence, burst data and amount of data to be read out, and then applies it to the read control 78. As earlier mentioned, the channel monitoring burst data read out of the data stores $72_1$ through $72_n$ in response to the read control signals from the read control circuit 78 are commonly fed to the multiplexer 80.

The multiplexer 80 multiplexes the burst data in the respective sequences which are applied thereto from the data stores $72_1$ through $72_n$. The multiplexed output is coupled to the ground station monitor circuit 82. Then, the monitor circuit 82 classifies the incoming multiplex channel monitoring data to provide them as channel monitoring information for the respective ground stations. The channel monitoring information will be reflected by the TDMA system operation monitoring function assigned to the monitor circuit 82.

In the illustrative embodiment shown in FIG. 4, the write control circuits $74_1$ through $74_n$ are provided in a very compact construction as one of constituents of the receive data processing device. The crux of the present invention, as previously stated, resides in multiplexing and, thereby, totally processing channel monitoring information associated with the respective ground stations other than a reference station by effective use of time periods except for those which are necessary for the separation of channel monitoring information associated with the respective sequences, i.e. idle time periods.

The foregoing description of the present invention has focused to a TDMA frame having a particular burst format as shown in FIG. 2. However, such a burst format is only illustrative and does not limit the present invention at all.

In summary, it will be seen that the present invention provides a receive data processing device for a TDMA satellite communications network which can be implemented in a comparatively small-scale circuit construction and promotes efficient transfer of channel monitoring information associated with various ground stations to a ground station monitor circuit.

Various modifications will become possible for those skilled in the art after receiving the teachings of the present disclosure without departing from the scope thereof.

What is claimed is:

1. A receive data processing device installed in a reference ground station which totally monitors and controls operating conditions of two or more other ground stations which constitute a ground traffic system of TDMA satellite communications channels, said device comprising:
   data store means for temporarily storing channel monitoring information signals which respectively are associated with operating conditions of the ground stations and separated from $n$ (particular positive integer) sequences of receive burst signals, which are received by way of an $n$-channel transponder loaded in a predetermined communication satellite, and predetermined burst identification signals for identifying the channel monitoring information signals in correspondence with the respective ground stations;

write control means for temporarily storing in the data store means associated with the $n$ sequences of receive burst signals the channel monitoring information signals and burst identification signals associated respectively with the predetermined ground stations which correspond to the respective sequences;

read control means for sequentially specifying in response to a predetermined read data sequence specify signal the channel monitoring information signals and the burst identification signals which are temporarily stored in the data store means and associated respectively with the ground stations which are associated with the $n$ sequences of received burst signals, and then reading out the specified information signals each by an amount which is specified by the read data sequence specify signal;

detector means for detecting amounts of data stored in data store areas of the data store means which respectively are associated with the ground stations in the $n$ sequences in response to predetermined write data amount indication signals and read data amount indication signals which respectively are outputted from the write control means and the read control means during a write control operation and a read control operation, and then generating the read data sequence specify signal which gives priority to a particular one of the data store areas having stored the greatest amount of data and specifies a particular amount of data to be read out;

multiplexer means for multiplexing the channel monitoring information signals and the burst identification signals which respectively are associated with the ground stations in the $n$ sequences and sequentially read out of the data store means; and ground station monitor means for classifying the multiplexed channel monitoring information signals and the burst signals outputted from said multiplexer means and associated with the respective ground stations in the $n$ sequences, and functioning to monitor use of the TDMA system which is related to operating conditions of the respective ground stations.

* * * * *